(12) United States Patent
Kaufmann et al.

(10) Patent No.: US 12,162,451 B2
(45) Date of Patent: Dec. 10, 2024

(54) ELECTROMAGNETIC DEVICE FOR A BRAKING SYSTEM FOR A VEHICLE, METHOD AND CONTROL UNIT FOR OPERATING AN ELECTROMAGNETIC DEVICE FOR A BRAKING SYSTEM FOR A VEHICLE, AND BRAKING SYSTEM FOR A VEHICLE

(71) Applicant: Knorr-Bremse Systeme Fuer Nutzfahrzeuge GmbH, Munich (DE)

(72) Inventors: Christian Kaufmann, Sindelfingen (DE); Thorsten Beyse, Dettingen (DE); Alfred Boeer, Heilbronn (DE); Nusret Dagtekin, Vaihingen (DE); Christian Dannheim, Pforzheim (DE); Guenter Herrmann, Stuttgart (DE); Aykun Kasakyan, Neu-Ulm (DE); Frank Scholl, Ingersheim (DE); Christian Dittmar, Korntal-Muenchingen (DE); Thomas Feucht, Wimsheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 617 days.

(21) Appl. No.: 17/298,748

(22) PCT Filed: Nov. 25, 2019

(86) PCT No.: PCT/EP2019/082433
§ 371 (c)(1),
(2) Date: Jun. 1, 2021

(87) PCT Pub. No.: WO2020/114822
PCT Pub. Date: Jun. 11, 2020

(65) Prior Publication Data
US 2022/0055596 A1 Feb. 24, 2022

(30) Foreign Application Priority Data

Dec. 3, 2018 (DE) .................. 10 2018 130 614.8

(51) Int. Cl.
*B60T 8/171* (2006.01)
*B60T 13/74* (2006.01)
(Continued)

(52) U.S. Cl.
CPC ............ *B60T 13/748* (2013.01); *B60T 8/171* (2013.01); *B60T 13/741* (2013.01);
(Continued)

(58) Field of Classification Search
CPC .... F16D 66/021; F16D 66/026; F16D 66/027; F16D 63/002; F16D 2121/20; F16D 2121/22; F16K 31/0679
See application file for complete search history.

(56) References Cited

U.S. PATENT DOCUMENTS 2,026,299 A * 12/1935 Boyd .................. G01F 23/62
336/136
2,791,119 A * 5/1957 Zinn .................. G01F 23/62
73/302
(Continued)

FOREIGN PATENT DOCUMENTS

CN 101248572 A 8/2008
CN 105485376 A 4/2016
(Continued)

OTHER PUBLICATIONS

International Search Report for PCT/EP2019/082433 Issued Feb. 18, 2020.

*Primary Examiner* — Thomas J Williams
(74) *Attorney, Agent, or Firm* — NORTON ROSE FULBRIGHT US LLP; Gerard A. Messina

(57) ABSTRACT

An electromagnetic device for a braking system for a vehicle, including: an armature made of a magnetizable
(Continued)

material; a bushing, wherein the armature is at least partially receivable inside the bushing; a first winding arrangement having at least one turn of an electrical conductor around the bushing and having two first electrical terminals; and a second winding arrangement having at least one turn of an electrical conductor around the bushing and having two second electrical terminals, the first winding arrangement and the second winding arrangement being galvanically isolated from one another, an inductive coupling being generatable between the first winding arrangement and the armature and between the second winding arrangement and the armature. Also described are a related method, a control apparatus, a braking system, and a computer readable medium.

18 Claims, 2 Drawing Sheets

(51) Int. Cl.
  *F16D 63/00*         (2006.01)
  *F16D 121/20*       (2012.01)
(52) U.S. Cl.
  CPC ........ *F16D 63/002* (2013.01); *B60T 2270/40* (2013.01); *F16D 2121/20* (2013.01)

(56) References Cited

U.S. PATENT DOCUMENTS

| | | | | |
|---|---|---|---|---|
| 3,381,181 | A | * | 4/1968 | Weathers .............. H01F 7/1615 |
| | | | | 335/251 |
| 3,882,959 | A | * | 5/1975 | Hsieh ...................... B60T 17/16 |
| | | | | 188/1.11 R |
| 5,899,436 | A | * | 5/1999 | Holmes ................. H01F 7/1607 |
| | | | | 251/129.1 |
| 6,412,613 | B1 | | 7/2002 | Lu |
| 6,968,859 | B1 | * | 11/2005 | Nagano .............. F16K 31/0679 |
| | | | | 137/554 |
| 7,228,783 | B2 | * | 6/2007 | Lochocki, Jr. ........ F16D 48/066 |
| | | | | 91/461 |
| 7,455,073 | B2 | * | 11/2008 | Shukhmin ................ F16K 1/54 |
| | | | | 251/129.09 |
| 2016/0265609 | A1 | | 9/2016 | Corsetti et al. |
| 2022/0055596 | A1 | * | 2/2022 | Kaufmann ............ F16D 63/002 |

FOREIGN PATENT DOCUMENTS

| | | |
|---|---|---|
| DE | 102008058865 A1 | 5/2010 |
| DE | 102013006605 A1 | 10/2014 |
| JP | 2003-11808 A | 1/2003 |
| JP | 2007157830 A | 6/2007 |
| JP | 2009109009 A | 5/2009 |
| JP | 2014224571 A | 12/2014 |
| JP | 2017528696 A | 9/2017 |
| WO | 2016012017 A1 | 1/2016 |
| WO | 201838020 A1 | 3/2018 |

* cited by examiner

ELECTROMAGNETIC DEVICE FOR A BRAKING SYSTEM FOR A VEHICLE, METHOD AND CONTROL UNIT FOR OPERATING AN ELECTROMAGNETIC DEVICE FOR A BRAKING SYSTEM FOR A VEHICLE, AND BRAKING SYSTEM FOR A VEHICLE

FIELD OF THE INVENTION

The present invention relates to an electromagnetic device for a braking system for a vehicle, to a method for operating an electromagnetic device for a braking system for a vehicle, to a corresponding control unit, and to a braking system for a vehicle.

BACKGROUND INFORMATION

In highly automated driving, a driver of a vehicle does not have to sit, for example, permanently at a driving position and be available for a corrective intervention. Therefore, conventional fallback levels cannot be used for critical situations. If a primary braking system is not available, a redundant braking system is supposed to take over the task of the driver. To depict a redundancy in this regard, in addition to the control units, the actuators and sensors including their wiring can also be embodied as redundant.

SUMMARY OF THE INVENTION

Against this background, it is an object of the present invention to provide an improved electromagnetic device for a braking system for a vehicle, an improved method for operating an electromagnetic device for a braking system for a vehicle, an improved control unit, and an improved braking system for a vehicle.

This object may be achieved by an electromagnetic device for a braking system for a vehicle, by a method for operating an electromagnetic device for a braking system for a vehicle, by a control unit, by a braking system for a vehicle, and by a corresponding computer program according to the main claims.

According to embodiments, in particular for a vehicle braking system, electromagnetic actuators and sensors can be configured having at least one redundant coil to provide a redundancy with respect to safety technology and additionally or alternatively with respect to voltage levels. For this purpose, for example, at least two winding arrangements of galvanically isolated electrical conductors can be or become arranged around a solenoid valve bushing or an inductive sensor. Therefore, in the case of a solenoid valve, in particular a force for controlling the solenoid valve can be applied in a galvanically isolated manner to a common armature. In the case of a sensor, an analog signal can be available similarly on both winding arrangements in order to be evaluated.

According to embodiments, in particular space or installation space can advantageously be saved, since, for example, solenoid valves and sensors of the braking system do not have to be embodied twice. Furthermore, costs can also be saved, since only redundant coils instead of redundant devices are to be provided. An operational reliability of the braking system and additionally or alternatively a usage bandwidth with respect to different levels of electric voltage which are used in the vehicle can thus be increased. Moreover, it is possible to prevent ground offsets, which can be induced by line resistances of feed lines and various current draws of control units connected to electromagnetic devices, from resulting in compensating currents, which would need to be secured.

An electromagnetic device for a braking system for a vehicle is presented, wherein the electromagnetic device includes the following features:
an armature made of a magnetizable material;
a bushing, wherein the armature is receivable at least partially inside the bushing;
a first winding arrangement having at least one turn of an electrical conductor around the bushing and having two first electrical terminals; and
a second winding arrangement having at least one turn of an electrical conductor around the bushing and having two second electrical terminals, wherein the first winding arrangement and the second winding arrangement are galvanically isolated from one another, wherein an inductive coupling can be generated between the first winding arrangement and the armature and between the second winding arrangement and the armature.

The vehicle can be a utility vehicle, for example a truck or the like. The electromagnetic device can be based on an electromagnetic action principle, in particular an inductive coupling between a magnetizable material and an electrical conductor through which electric current flows. The magnetizable material can be a ferromagnetic material. The bushing can be formed from a non-magnetizable or magnetizable material. A number of turns of the first winding arrangement can correspond to a number of turns of the second winding arrangement. A dimension of the electrical conductor of the first winding arrangement can also correspond to a dimension of the electrical conductor of the second winding arrangement. Furthermore, a material of the electrical conductor of the first winding arrangement can correspond to a material of the electrical conductor of the second winding arrangement. A first control unit can be connectable to the first electrical terminals of the first winding arrangement. The first control unit or a second control unit can be connectable to the second electrical terminals of the second winding arrangement. The inductive coupling can alternately be generated between the first winding arrangement and the armature and additionally or alternatively between the second winding arrangement and the armature.

According to one embodiment, the device can be configured as an actuator or as a sensor for the braking system. In particular if the device is configured as an actuator, the armature can be receivable or received at least partially inside the bushing so it is translationally movable relative to the bushing. The actuator can be a solenoid valve of the braking system. The sensor can be a magnetic field sensor or the like. Such an embodiment offers the advantage that both actuators and also sensors can be operated having a redundant coil in order to enable a redundant braking system and additionally or alternatively a redundant functionality.

The device can also include a third winding arrangement having at least one turn of an electrical conductor around the bushing and having two third electrical terminals and a fourth winding arrangement having at least one turn of an electrical conductor around the bushing and having two fourth electrical terminals. The third winding arrangement and the fourth winding arrangement can be galvanically isolated from one another and from the first winding arrangement and the second winding arrangement. An inductive coupling can be able to be generated between the third winding arrangement and the armature and between the fourth winding arrangement and the armature. Such an embodiment offers the advantage that a correct operation of the electromagnetic device on the basis of multiple levels of an electric voltage in the vehicle can be enabled.

Furthermore, the winding arrangements can be switchable or switched electrically in parallel and additionally or alternatively electrically in series. Two winding arrangements can be electrically switched in parallel, for example. Of four winding arrangements, for example, each two winding arrangements can be electrically switched in series in order to form two groups of winding arrangements, wherein these two groups can be electrically switched in parallel. Such an embodiment offers the advantage that different usage options of the electromagnetic device can be configured and enabled in a simple and safe manner.

Moreover, at least two terminals of different winding arrangements can be electrically connected to one another. An electrical connection of the at least two terminals of the different winding arrangements can be or become produced by bonding or another connection technology. Such an embodiment offers the advantage that an electrical series circuit of winding arrangements can be implemented in a reliable, inexpensive, and space-saving manner.

The electrical terminals can also be formed in order to be contactable individually or jointly by at least one plug. Therefore, a common plug can be used or separate plugs can be used in order to contact the electrical terminals of all winding arrangements. Such an embodiment offers the advantage that the electromagnetic device can be adapted to different usage environments in a simple manner with respect to an external connection thereof.

Furthermore, a method for operating an electromagnetic device for a braking system for a vehicle is presented, wherein the electromagnetic device is an embodiment of the above-mentioned electromagnetic device, wherein the method includes the following step:

applying an electrical actuating signal to electrical terminals of at least one of the winding arrangements in order to move the armature translationally relative to the bushing, or reading an electrical detection signal from electrical terminals of at least one of the winding arrangements in order to detect whether a translational relative movement occurs between the armature and the bushing or a movement occurs between the device and an object.

The method or the steps of the method can be executed using at least one control unit. According to one embodiment, in which the electromagnetic device is configured as an actuator, the method can include the step of application. According to another embodiment, in which the electromagnetic device is configured as a sensor, the method can include the step of reading. The object can be a component of the vehicle, the movement or location of which is to be detected. For example, the object can include a pole wheel. Pole wheel teeth can move past the device, wherein the armature can remain fixed in the bushing. A magnetic field change can result due to a change of the magnetic resistance, which can in turn result in an induced voltage in the winding arrangements.

According to one embodiment, in the step of application, the actuating signal can be applied in a first operating mode of the braking system to electrical terminals of at least one first one of the winding arrangements and in a second operating mode of the braking system to electrical terminals of at least one second one of the winding arrangements. Alternatively, in the step of reading, the detection signal can be read in a first operating mode of the braking system from electrical terminals of at least one first one of the winding arrangements and in a second operating mode of the braking system from electrical terminals of at least one second one of the winding arrangements. The first operating mode can be an interference-free operating mode or an operating mode on a first level of an electric voltage. The second operating mode can be an operating mode if interference has occurred or an operating mode on a second level of an electric voltage. Such an embodiment offers the advantage that a redundancy can be produced in the braking system in a simple and space-saving manner, wherein more failsafe operation and additionally or alternatively operation using multiple electric voltages can be taken into consideration.

The approach presented here furthermore provides a control unit which is configured to carry out, activate, or implement the steps of a variant of a method presented here in corresponding apparatuses. The underlying object of the invention can also be achieved quickly and efficiently by this embodiment variant of the invention in the form of a control unit.

For this purpose, the control unit can include at least one processing unit for processing signals or data, at least one storage unit for storing signals or data, at least one interface to a sensor or an actuator for reading sensor signals from the sensor or for outputting control signals to the actuator, and/or at least one communication interface for reading or outputting data, which are embedded in a communication protocol. The processing unit can be, for example, a signal processor, a microcontroller, or the like, wherein the storage unit can be a flash memory, an EEPROM, or a magnetic storage unit. The communication interface can be configured to read or output data in a wireless and/or wired manner, wherein a communication interface which can read or output wired data can read these data, for example, electrically or optically from a corresponding data transmission line or can output them into a corresponding data transmission line.

A control unit can be understood in the present case as an electrical device which processes sensor signals and outputs control and/or data signals as a function thereof. The control unit can include an interface, which can be configured in hardware and/or software. In a hardware configuration, the interfaces can be, for example, part of a so-called system ASIC, which contains greatly varying functions of the control unit. However, it is also possible that the interfaces are separate integrated circuits or at least partially consist of discrete components. In a software configuration, the interfaces can be software modules which are provided, for example, on a microcontroller in addition to other software modules.

Moreover, a braking system for a vehicle is presented, wherein the braking system includes the following features:

at least one exemplar of an embodiment of the above-mentioned electromagnetic device; and at least one exemplar of an embodiment of the above-mentioned control unit, wherein the at least one control unit is electrically connected to winding arrangements of the at least one electromagnetic device.

At least one exemplar of an embodiment of the above-mentioned control unit and an embodiment of the above-mentioned electromagnetic device can each advantageously be employed or used in conjunction with the braking system in order to enable operation of the braking system which is redundant with respect to safety from failure and additionally or alternatively with respect to multiple voltage levels.

A computer program product or computer program is also advantageous, having program code which can be stored on a machine-readable carrier or storage medium such as a semiconductor memory, a hard drive memory, or an optical memory and is used to carry out, implement, and/or activate the steps of the method according to one of the above-described embodiments, in particular when the program product or the program is executed on a computer or a device.

Exemplary embodiments of the approach presented here are explained in greater detail in the following description with reference to the figures.

DETAILED DESCRIPTION

Figure 1:
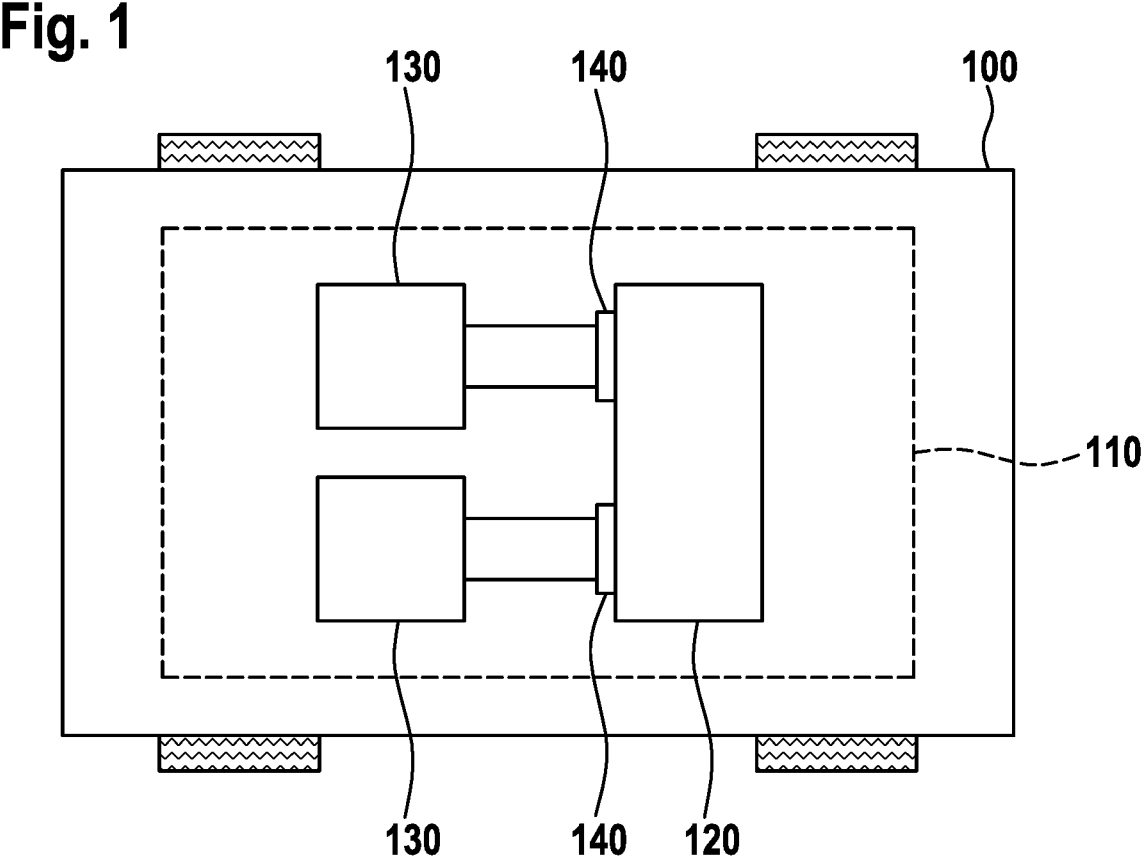
FIG. 1 shows a schematic illustration of a vehicle having a braking system according to one exemplary embodiment.

FIG. 1 shows a schematic illustration of a vehicle 100 having a braking system 110 according to one exemplary embodiment. The vehicle 100 is a motor vehicle, for example a utility vehicle, in particular a truck or the like. The vehicle 100 includes the braking system 110. In the illustration of FIG. 1, only an electromagnetic device 120 and, for example, two control units 130 are shown by way of example of the braking system 110. According to one exemplary embodiment, the braking system 110 can include another combination of numbers of electromagnetic devices 120 and control units 130.

Each of the control units 130 is connected electrically or by electrical lines to the electromagnetic device 120. The electromagnetic device 120 is explained in greater detail with reference to the following figures. It is solely to be noted at this point that the electromagnetic device 120 includes at least two electrical coils or winding arrangements which are galvanically isolated from one another. A first of the control units 130 is electrically connected to one first one of the winding arrangements of the electromagnetic device 120. A second of the control units 130 is electrically connected to one second one of the winding arrangements of the electromagnetic device 120.

According to the exemplary embodiment shown in FIG. 1, each of the control units 130 is electrically connected via a separate plug 140 to the electromagnetic device 120 or one of the winding arrangements of the electromagnetic device 120.

According to one exemplary embodiment, the first of the control units 130 is configured to control a normal mode of the braking system 110 and/or the electromagnetic device 120. In this case, the second of the control units 130 is configured to control an auxiliary mode of the braking system 110 and/or the electromagnetic device 120 provided for redundancy. According to another exemplary embodiment, the first of the control units 130 is configured to activate the electromagnetic device 120 using electrical signals at a first voltage level. In this case, the second of the control units 130 is configured to activate the electromagnetic device 120 using electrical signals at a second voltage level. The voltage levels are different from one another.

The electromagnetic device 120 is configured according to one exemplary embodiment as an actuator, for example, as a solenoid valve. Electrical actuating signals are transmittable here between the electromagnetic device 120 and at least one of the control units 130. According to another exemplary embodiment, the electromagnetic device 120 is configured as a sensor. Electrical detection signals are transmittable between the electromagnetic device 120 and at least one of the control units 130.

Figure 2:
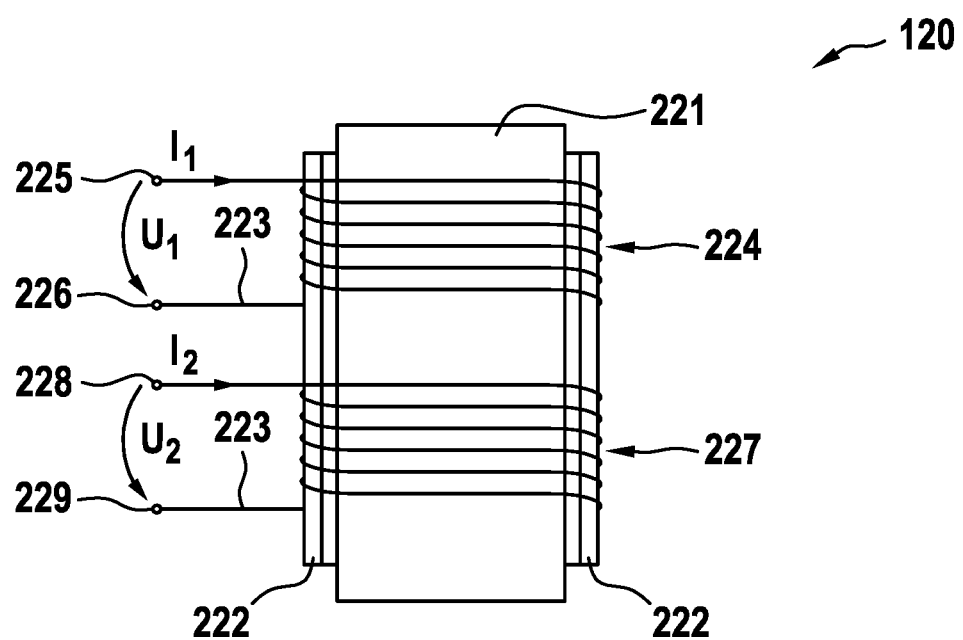
FIG. 2 shows a schematic illustration of an electromagnetic device according to one exemplary embodiment.

FIG. 2 shows a schematic illustration of an electromagnetic device 120 according to one exemplary embodiment. The electromagnetic device 120 corresponds or is similar to the electromagnetic device from FIG. 1. The electromagnetic device 120 includes an armature 221, a bushing 222, electrically conductive wire 223, a first winding arrangement 224 having two first electrical terminals 225 and 226, and a second winding arrangement 227 having two second electrical terminals 228 and 229.

The armature 221 is formed from a magnetizable material. More precisely, the armature 221 is formed for example from a ferromagnetic material. The armature 221 has an oblong shape, for example a cylindrical shape. The armature 221 is arranged at least partially received inside the bushing 222. In other words, the bushing 222 is formed to enclose at least a subsection of the armature 221. The armature 221 is arranged fixedly or translationally moving or movable relative to the bushing 222. The bushing 222 is formed, for example, from a non-magnetizable material.

The first winding arrangement 224 includes at least one turn, typically a plurality of turns, of an electrical conductor formed from the electrically conductive wire 223 around the bushing 222. Furthermore, the first winding arrangement 224 includes a first electrical input terminal 225 and a first electrical output terminal 226. The first electrical terminals 225 and 226 represent ends of the electrical conductor or the electrically conductive wire 223 used for the electrical conductor of the first winding arrangement 224 here. The second winding arrangement 227 includes at least one turn, typically a plurality of turns, of an electrical conductor formed from the electrically conductive wire 223 around the bushing 222. Moreover, the second winding arrangement 227 includes a second electrical input terminal 228 and a second electrical output terminal 229. The second electrical terminals 228 and 229 represent ends of the electrical conductor or the electrically conductive wire 223 used for the electrical conductor of the second winding arrangement 227 in this case.

A first electric current $I_1$ can be conducted in the electrical conductor of the first winding arrangement 224. A first electric voltage $U_1$ can be applied or drop between the first electric input terminal 225 and the first electrical output terminal 226. A second electric current $I_2$ can be conducted in the electrical conductor of the second winding arrangement 227. A second electric voltage $U_2$ can be applied or drop between the second electrical input terminal 228 and the second electrical output terminal 229.

The first winding arrangement 224 and the second winding arrangement 227 are arranged around the bushing 222. The first winding arrangement 224 represents a first electrical coil and the second winding arrangement 227 represents a second electrical coil. The first winding arrangement 224 and the second winding arrangement 227 are galvanically isolated from one another. The first winding arrangement 224 and the second winding arrangement 227 are electrically connected in parallel with respect to one another. An inductive coupling can thus be generated between the first winding arrangement 224 and the armature 221. For example, if a translational relative movement occurs between the armature 221 and the bushing 222 having the first winding arrangement 224 or a movement of an object occurs relative to the device 120, the first electric current I₁ flows in the electrical conductor of the first winding arrangement 224. An inductive coupling can be generated between the second winding arrangement 227 and the armature 221. For example, if a translational relative movement occurs between the armature 221 and the bushing 222 having the second winding arrangement 227 or a movement of an object occurs relative to the device 120, the second electric current I₂ flows in the electrical conductor of the second winding arrangement 227.

The first electrical input terminal 225 and the first electrical output terminal 226, on the one hand, and the second electrical input terminal 228 and the second electrical output terminal 229 can be electrically contacted here by individual or separate plugs or by a common plug. Thus, for example, an electrical connection of the winding arrangements 224 and 227 to at least one control unit of the braking system can be established.

Figure 3:
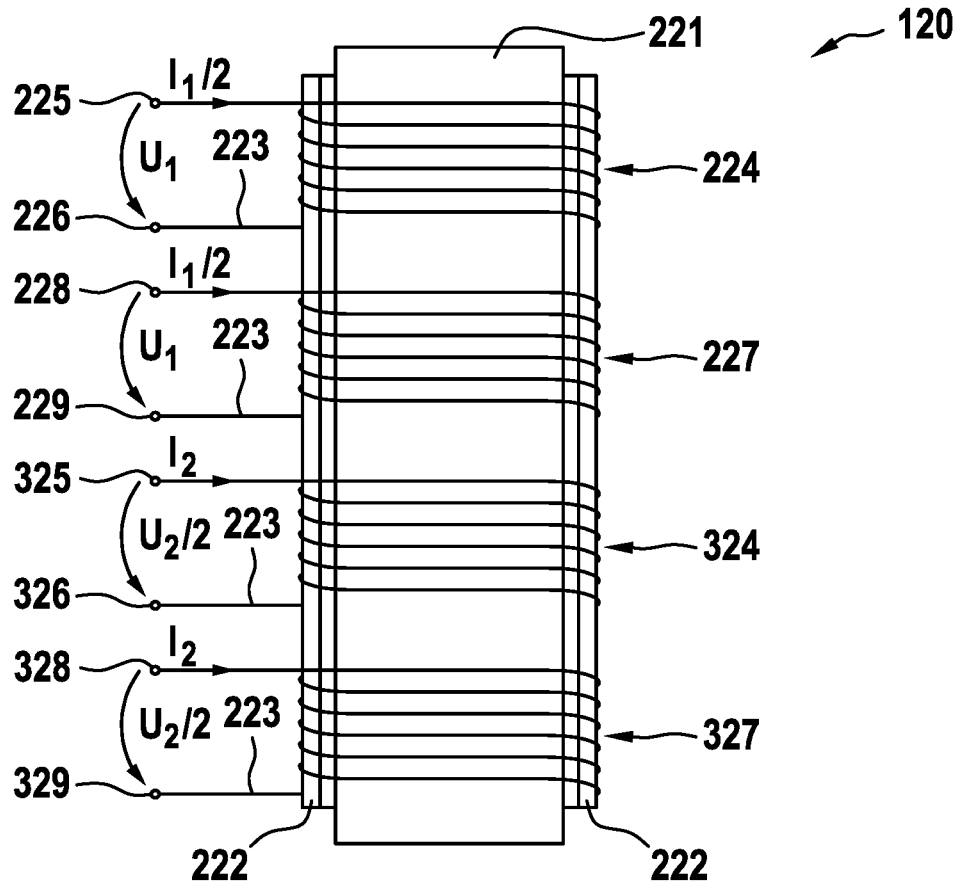
FIG. 3 shows a schematic illustration of an electromagnetic device according to one exemplary embodiment.

FIG. 3 shows a schematic illustration of an electromagnetic device 120 according to one exemplary embodiment. The electromagnetic device 120 corresponds here to the electromagnetic device from FIG. 2 with the exception that in addition a third winding arrangement 324 and a fourth winding arrangement 327 are provided and an interconnection of the winding arrangements 224, 227, 324, and 327 is modified.

The third winding arrangement 324 includes at least one turn, typically a plurality of turns, of an electrical conductor formed from the electrically conductive wire 223 around the bushing 222. Furthermore, the third winding arrangement 324 includes a third electrical input terminal 325 and a third electrical output terminal 326. The third electrical terminals 325 and 326 represent ends of the electrical conductor or the electrically conductive wire 223 used for the electrical conductor of the third winding arrangement 324 in this case. The fourth winding arrangement 327 includes at least one turn, typically a plurality of turns, of an electrical conductor formed from the electrically conductive wire 223 around the bushing 222. Moreover, the fourth winding arrangement 327 includes a fourth electrical input terminal 328 and a fourth electrical output terminal 329. The fourth electrical terminals 328 and 329 represent ends of the electrical conductor or the electrically conductive wire 223 used for the electrical conductor of the fourth winding arrangement 327 here.

The third winding arrangement 324 and the fourth winding arrangement 327 are arranged around the bushing 222. The third winding arrangement 324 represents a third electrical coil and the fourth winding arrangement 327 represents a fourth electrical coil. The third winding arrangement 324 and the fourth winding arrangement 327 are galvanically isolated from one another.

According to the exemplary embodiment shown in FIG. 3, the first winding arrangement 224 and the second winding arrangement 227 are electrically connected in series with respect to one another. The first electrical output terminal 226 can be electrically connected to the second electrical input terminal 228 for this purpose. The third winding arrangement 324 and the fourth winding arrangement 327 are connected electrically in series with respect to one another. For this purpose, the third electrical output terminal 326 can be electrically connected to the fourth electrical input terminal 328. The first winding arrangement 224 and the second winding arrangement 227 are electrically connected in parallel to the third winding arrangement 324 and the fourth winding arrangement 327.

Half of a first electric current I₁ can be conducted in each case in the electrical conductor of the first winding arrangement 224 and in the electrical conductor of the second winding arrangement 227. A first electric voltage U₁ can be applied or drop between the first electrical input terminal 225 and the first electrical output terminal 226 and also between the second electrical input terminal 228 and the second electrical output terminal 229. An inductive coupling can thus be generated between the first winding arrangement 224 and the second winding arrangement 227 and the armature 221. For example, if a translational relative movement occurs between the armature 221 and the bushing 222 having the first winding arrangement 224 and the second winding arrangement 227 or a movement occurs between an object and the device 120, the first electric current I₁ flows in the electrical conductor of the first winding arrangement 224 and the second winding arrangement 227.

A second electric current I₂ can be conducted in the electrical conductor of the third winding arrangement 324 and in the electrical conductor of the fourth winding arrangement 327. Half of a second electric voltage U₂ can be applied or drop in each case between the third electrical input terminal 325 and the third electrical output terminal 326 and also between the fourth electrical input terminal 328 and the fourth electrical output terminal 329. An inductive coupling can thus be generated between the third winding arrangement 324 and the fourth winding arrangement 327 and the armature 221. For example, if a translational relative movement occurs between the armature 221 and the bushing 222 having the third winding arrangement 324 and the fourth winding arrangement 327 or a movement occurs between an object and the device 120, the second electric current I₂ flows in the electrical conductor of the third winding arrangement 324 and the fourth winding arrangement 327.

In other words, it is possible by the electromagnetic device 120 according to the exemplary embodiment shown in FIG. 3 to bring various voltage levels into harmony with the redundancy concept in the vehicle. For this purpose, for example, four winding arrangements 224, 227, 324, and 327 can be provided. With suitable configuration of the winding arrangements 224, 227, 324, and 327 for example, a solenoid valve for operation at 12 V or 24 V can be implemented by internal bonding of an electrical series circuit or parallel circuit. Voltage level combinations of 24 V and 48 V are also conceivable.

The following statements can be made with respect to the winding arrangements 224 and 227 and optionally additionally 324 and 327 of the electromagnetic device 120 from FIG. 2 or FIG. 3.

The resistances result as:

$$R_1 + R_1 = 2R_1 = R_{Series}$$

$$\frac{R_1 \cdot R_1}{R_1 + R_1} = \frac{R_1}{2} = R_{Parallel}$$

Statically, the currents are then:

$$I = \frac{U}{R}$$

$$I(U_1) = \frac{U_1}{R_{Series}} = \frac{U_1}{2R_1}$$

$$I\left(\frac{U_1}{2}\right) = \frac{\frac{U_1}{2}}{R_{Parallel}} = \frac{\frac{U_1}{2}}{\frac{R_1}{2}} = \frac{U_1}{R_1}$$

For the magnetic field, this means:

$$B = \frac{\mu}{2\pi r}NI = \frac{\mu}{2\pi r}N(U_1)I(U_1) = \frac{\mu}{2\pi r}N\left(\frac{U_1}{2}\right)I\left(\frac{U_1}{2}\right)$$

if $$N(U_1) = 2N\left(\frac{U_1}{2}\right)$$

Since the force is proportional to the magnetic field, the conclusion results that by connecting two identical winding arrangements in series or in parallel, the useful voltage can be any desired voltage and half thereof.

Figure 4:
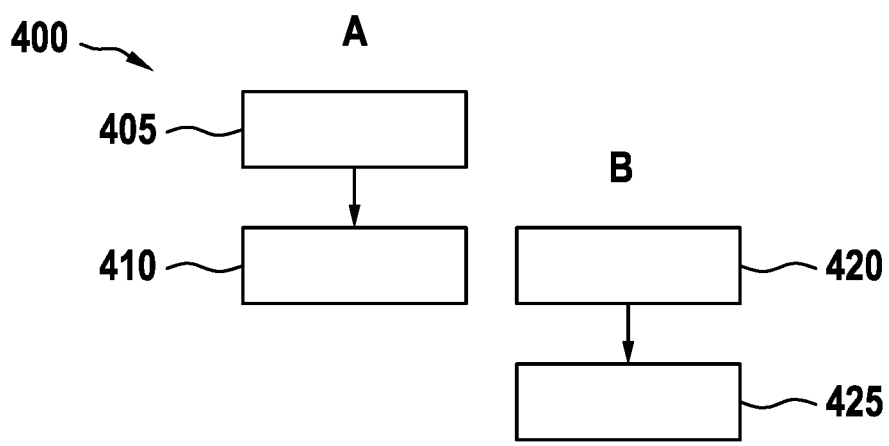
FIG. 4 shows a flow chart of a method for operating according to one exemplary embodiment.

FIG. 4 shows a flow chart of a method 400 for operation according to one exemplary embodiment. The method 400 is executable to operate an electromagnetic device for a braking system for a vehicle or to control an operation thereof. In this case, the braking system corresponds or is similar to the braking system from FIG. 1. In a first variant A of the method 400 for operation, the electromagnetic device is configured as an actuator of the braking system, for example as a solenoid valve. In a second variant B of the method 400 for operation, the electromagnetic device is configured as a sensor of the braking system.

In the first variant A, the method 400 for operation includes a step 410 of applying an electrical actuating signal to electrical terminals of at least one of the winding arrangements in order to translationally move the armature relative to the bushing. The method 400 for operation in the first variant A optionally includes, before step 410 of application, also a step 405 of receiving a request signal. The request signal represents here a requested actuation of the electromagnetic device, upon which a translational movement of the armature in relation to the bushing takes place. According to one exemplary embodiment, in step 410 of application, the actuating signal is applied in a first operating mode of the braking system to electrical terminals of at least one first one of the winding arrangements and in a second operating mode of the braking system to electrical terminals of at least one second one of the winding arrangements. Operating modes are to be understood as a normal mode or an auxiliary mode or alternatively a mode on a first electric voltage level or a mode on a second electric voltage level. In the first operating mode, a first control unit can be used to activate the electromagnetic device, wherein in the second operating mode, a second control unit can be used to activate the electromagnetic device.

In the second variant B, the method 400 for operation includes a step 420 of reading an electrical detection signal from electrical terminals of at least one of the winding arrangements, in order to detect whether a translational relative movement occurs between the armature and the bushing or a movement occurs between the device and an object, wherein the armature is arranged fixedly relative to the bushing. The method 400 for operation optionally includes in the second variant B, after step 420 of reading, a step 425 of evaluating the read detection signal. According to one exemplary embodiment, in step 420 of reading, the detection signal is read in the first operating mode of the braking system from electrical terminals of at least one first one of the winding arrangements and in the second operating mode of the braking system from electrical terminals of at least one second one of the winding arrangements.

A detection of the respective operating mode or a respective active control unit is conceivable similarly to an inductive transformer both in the first variant A and also in the second variant B.

THE LIST OF REFERENCE SIGNS IS AS FOLLOWS 100 vehicle
110 braking system
120 electromagnetic device
130 control unit
140 plug
221 armature
222 bushing
223 electrically conductive wire
224 first winding arrangement
225 first input terminal
226 first output terminal
227 second winding arrangement
228 second input terminal
229 second output terminal
$I_1$ first electric current
$I_2$ second electric current
$U_1$ first electric voltage
$U_2$ second electric voltage
324 third winding arrangement
325 third input terminal
326 third output terminal
327 fourth winding arrangement
328 fourth input terminal
329 fourth output terminal
400 method for operation
405 step of reception
410 step of application
420 step of reading
425 step of evaluation

The invention claimed is:

1. An electromagnetic device for a braking system, having a first operating mode and a second operating mode, for a vehicle, comprising:
    an armature made of a magnetizable material;
    a bushing, wherein the armature is at least partially receivable inside the bushing;
    a first winding arrangement having at least one turn of an electrical conductor around the bushing and having two first electrical terminals; and
    a second winding arrangement having at least one turn of an electrical conductor around the bushing and having two second electrical terminals, wherein the first winding arrangement and the second winding arrangement are galvanically isolated from one another, wherein an inductive coupling is generatable between the first winding arrangement and the armature and between the second winding arrangement and the armature;
    wherein the first winding arrangement is configured to be electrically connected to a first control unit, and wherein the second winding arrangement is configured to be electrically connected to a second control unit, and
    wherein an electrical detection signal is read in the first operating mode of the braking system from electrical terminals of the first winding arrangement and in the second operating mode of the braking system from electrical terminals of the second winding arrangement.

2. The electromagnetic device of claim 1, wherein the device is configured as an actuator or as a sensor for the braking system, and/or wherein the armature is receivable at least partially inside the bushing so it is translationally movable relative to the bushing.

3. The electromagnetic device of claim 2, wherein the first control unit is configured to control a normal mode of the braking system and/or the electromagnetic device, and wherein the second control unit is configured to control a auxiliary mode of the braking system.

4. The electromagnetic device of claim 1, further comprising:
a third winding arrangement having at least one turn of an electrical conductor around the bushing and having two third electrical terminals; and
a fourth winding arrangement having at least one turn of an electrical conductor around the bushing and having two fourth electrical terminals;
wherein the third winding arrangement and the fourth winding arrangement are galvanically isolated from one another and from the first winding arrangement and the second winding arrangement, wherein an inductive coupling is generatable between the third winding arrangement and the armature and between the fourth winding arrangement and the armature.

5. The electromagnetic device of claim 1, wherein the winding arrangements are switchable or switched electrically in parallel and/or electrically in series.

6. The electromagnetic device of claim 1, wherein at least two terminals of different winding arrangements are electrically connected to one another.

7. The electromagnetic device of claim 1, wherein the electrical terminals are formed to be contactable individually or jointly by at least one plug.

8. The electromagnetic device of claim 1, wherein the first winding arrangement is configured to be electrically connected via a first plug unit to the first control unit, and wherein the second winding arrangement is configured to be electrically connected via a second plug unit to the second control unit.

9. A method for operating an electromagnetic device for a braking system, having a first operating mode and a second operating mode, for a vehicle, the method comprising:
applying an electrical actuating signal to electrical terminals of at least one of a first winding arrangement and a second winding arrangement, so as to translationally move an armature relative to a bushing, or
reading an electrical detection signal from electrical terminals of at least one of the winding arrangements, so as to detect whether a translational relative movement occurs between the armature and the bushing or a movement occurs between the device and an object;
wherein the electromagnetic device includes:
the armature, which is made of a magnetizable material;
the bushing, wherein the armature is at least partially receivable inside the bushing;
wherein the first winding arrangement has at least one turn of an electrical conductor around the bushing and having two first electrical terminals,
wherein the second winding arrangement has at least one turn of an electrical conductor around the bushing and having two second electrical terminals, wherein the first winding arrangement and the second winding arrangement are galvanically isolated from one another, wherein an inductive coupling is generatable between the first winding arrangement and the armature and between the second winding arrangement and the armature, and
wherein the first winding arrangement is configured to be electrically connected to a first control unit, and wherein the second winding arrangement is configured to be electrically connected to a second control unit, and
wherein the electrical detection signal is read in the first operating mode of the braking system from electrical terminals of the first winding arrangement and in the second operating mode of the braking system from electrical terminals of the second winding arrangement.

10. The method of claim 9, wherein in the applying, the actuating signal is applied in a first operating mode of the braking system to electrical terminals of at least one first one of the winding arrangements and is applied in a second operating mode of the braking system to electrical terminals of at least one second one of the winding arrangements or in step of reading, the electrical detection signal is read in a first operating mode of the braking system from electrical terminals of at least one first one of the winding arrangements and is read in a second operating mode of the braking system from electrical terminals of at least one second one of the winding arrangements.

11. The method of claim 9, wherein the first winding arrangement is configured to be electrically connected via a first plug unit to the first control unit, and wherein the second winding arrangement is configured to be electrically connected via a second plug unit to the second control unit.

12. A control apparatus for operating an electromagnetic device for a braking system, having a first operating mode and a second operating mode, for a vehicle, comprising:
at least one control unit configured to perform the following:
applying an electrical actuating signal to electrical terminals of at least one of a plurality of winding arrangements, so as to translationally move an armature relative to a bushing, or
reading an electrical detection signal from electrical terminals of at least one of the winding arrangements, so as to detect whether a translational relative movement occurs between the armature and the bushing or a movement occurs between the device and an object;
wherein the electromagnetic device includes:
the armature made of a magnetizable material;
the bushing, wherein the armature is at least partially receivable inside the bushing;
wherein a first winding arrangement has at least one turn of an electrical conductor around the bushing and having two first electrical terminals,
wherein a second winding arrangement has at least one turn of an electrical conductor around the bushing and having two second electrical terminals, wherein the first winding arrangement and the second winding arrangement are galvanically isolated from one another, wherein an inductive coupling is generatable between the first winding arrangement and the armature and between the second winding arrangement and the armature, and
wherein the first winding arrangement is configured to be electrically connected o a first control unit, and wherein the second winding arrangement is configured to be electrically connected to a second control unit, and
wherein the electrical detection signal is read in the first operating mode of the braking system from electrical terminals of the first winding arrangement and in the second operating mode of the braking system from electrical terminals of the second winding arrangement.

13. The control apparatus of claim 12, wherein the first winding arrangement is configured to be electrically connected via a first plug unit to the first control unit, and wherein the second winding arrangement is configured to be electrically connected via a second plug unit to the second control unit.

14. A braking system, having a first operating mode and a second operating mode, for a vehicle, comprising:
at least one electromagnetic device; and
a first control unit and a second control unit, each of which is configured to perform the following:
applying an electrical actuating signal to electrical terminals of at least one of a plurality of winding arrangements, so as to translationally move an armature relative to a bushing, or
reading an electrical detection signal from electrical terminals of at least one of the winding arrangements, so as to detect whether a translational relative movement occurs between the armature and the bushing or a movement occurs between the device and an object;
wherein the electromagnetic device includes:
the armature made of a magnetizable material;
the bushing, wherein the armature is at least partially receivable inside the bushing;
wherein a first winding arrangement has at least one turn of an electrical conductor around the bushing and having two first electrical terminals,
wherein a second winding arrangement has at least one turn of an electrical conductor around the bushing and having two second electrical terminals, wherein the first winding arrangement and the second winding arrangement are galvanically isolated from one another, wherein an inductive coupling is generatable between the first winding arrangement and the armature and between the second winding arrangement and the armature, and
wherein the first winding arrangement is configured to be electrically connected to a first control unit, and wherein the second winding arrangement is configured to be electrically connected to a second control unit, and
wherein the electrical detection signal is read in the first operating mode of the braking system from electrical terminals of the first winding arrangement and in the second operating mode of the braking system from electrical terminals of the second winding arrangement.

15. The braking system of claim 14, wherein the first winding arrangement is configured to be electrically connected via a first plug unit to the first control unit, and wherein the second winding arrangement is configured to be electrically connected via a second plug unit to the second control unit.

16. A non-transitory computer readable medium having a computer program, which is executable by at least one processor, comprising:
a program code arrangement having program code for operating an electromagnetic device for a braking system, having a first operating mode and a second operating mode, for a vehicle, by performing the following:
applying an electrical actuating signal to electrical terminals of at least one of a first winding arrangement and a second winding arrangement, so as to translationally move an armature relative to a bushing, or
reading an electrical detection signal from electrical terminals of at least one of the winding arrangements, so as to detect whether a translational relative movement occurs between the armature and a bushing or a movement occurs between the device and an object;
wherein the electromagnetic device includes:
the armature made of a magnetizable material;
the bushing, wherein the armature is at least partially receivable inside the bushing;
wherein the first winding arrangement has at least one turn of an electrical conductor around the bushing and having two first electrical terminals,
wherein the second winding arrangement has at least one turn of an electrical conductor around the bushing and having two second electrical terminals, wherein the first winding arrangement and the second winding arrangement are galvanically isolated from one another, wherein an inductive coupling is generatable between the first winding arrangement and the armature and between the second winding arrangement and the armature, and
wherein the first winding arrangement is configured to be electrically connected to a first control unit, and wherein the second winding arrangement is configured to be electrically connected to a second control unit, and
wherein the electrical detection signal is read in the first operating mode of the braking system from electrical terminals of the first winding arrangement and in the second operating mode of the braking system from electrical terminals of the second winding arrangement.

17. The computer readable medium of claim 16, wherein:
a third winding arrangement has at least one turn of an electrical conductor around the bushing and has two third electrical terminals; and
a fourth winding arrangement has at least one turn of an electrical conductor around the bushing and having two fourth electrical terminals;
wherein the third winding arrangement and the fourth winding arrangement are galvanically isolated from one another and from the first winding arrangement and the second winding arrangement, and wherein an inductive coupling is generatable between the third winding arrangement and the armature and between the fourth winding arrangement and the armature.

18. The computer readable medium of claim 16, wherein the first winding arrangement is configured to be electrically connected via a first plug unit to the first control unit, and wherein the second winding arrangement is configured to be electrically connected via a second plug unit to the second control unit.

* * * * *